E. NOLAN.
OIL BOLT.
APPLICATION FILED MAR. 6, 1917.
1,233,392.
Patented July 17, 1917.
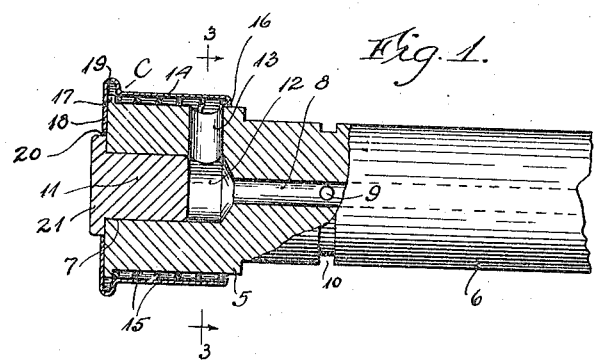
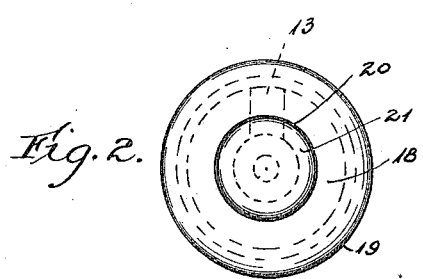
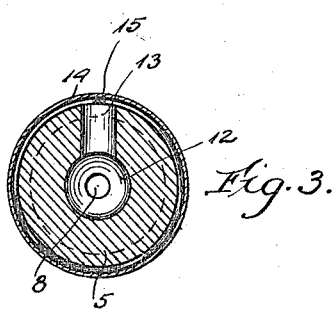
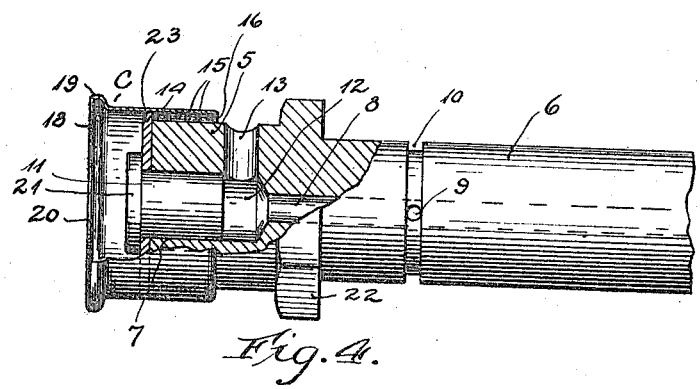
Inventor,
Edmund Nolan
By James R. Offield
Atty.

UNITED STATES PATENT OFFICE.

EDMUND NOLAN, OF DETROIT, MICHIGAN, ASSIGNOR TO THE WINKLEY COMPANY, OF DETROIT, MICHIGAN, A CORPORATION OF MICHIGAN.

OIL-BOLT.

1,233,392.  Specification of Letters Patent.  Patented July 17, 1917.

Application filed March 6, 1917. Serial No. 152,612.

*To all whom it may concern:*

Be it known that I, EDMUND NOLAN, a citizen of the United States, and a resident of Detroit, in the county of Wayne and State of Michigan, have invented certain new and useful Improvements in Oil-Bolts, of which the following is a specification.

My invention relates to oil bolts, that is, to bolts provided with oil entrance and distributing passageways.

Among the important objects of my invention is to provide improved protecting cap arrangement comprising a cap slidable longitudinally on the bolt head to be normally held by a spring in a position to close the oil inlet and to be readily pulled outwardly to expose the inlet for the application of oil. Another object is to so construct the bolt head that it can be readily struck at its outer end without touching the cap in order that the bolt may be driven into place without danger of injuring the cap.

The various features of my invention are clearly illustrated on the accompanying drawings, in which—

Figure 1 is a side elevational view of the head end of a bolt partly in vertical diametral section, Fig. 2 is an end view thereof, Fig. 3 is a sectional view on plane 3—3, Fig. 1, and Fig. 4 is a side elevational view partly in diametral section showing a modified arrangement.

The bolt shown in Figs. 1 and 3 has the cylindrical head 5 and the cylinder shank 6 of reduced diameter. The head is bored axially to provide the cylinder pocket 7 from whose end the passageway 8 of reduced diameter is bored a considerable distance through the bolt shank to communicate with oil discharge openings 9 leading to circumferential grooves 10. The head bore or pocket 7 is closed at its outer end by a plug 11 to leave the inner space 12, and the head is then drilled radially to provide the oil feed hole 13 to the space 12, the charged in oil flowing from this space through the passageway 8 to be distributed to the bearing surfaces of the bolt and the parts pivoted on or connected together by the bolt.

A protecting cap C of sheet metal is provided for the oil hole 13, the cylindrical body 14 of this cap being of slightly larger diameter than the bolt head to permit the introduction of a helical spring 15, this spring abutting against the in-turned flange 16 at the inner end of the cap, and the flange 17 at the outer end of the head. The spring tends to hold the cap body inwardly to cover the oil hole 13 but such inward movement is limited by the head 18 of the cap which abuts against the outer end of the bolt head, the juncture of the cap and body having the annular bead or flange 19 to give a finger hold to enable the cap to be drawn outwardly to expose the oil hole. Normally, therefore, the cap is held in by the spring to cover and protect the oil hole and can be readily pulled outwardly against the force of the spring to expose the oil hole so that the spout of an oil can can be readily inserted.

It is sometimes necessary to strike the bolt in order to force it into the holes of parts to be supported or connected together, but where the cap head extends entirely over the bolt head it is impossible to do this without striking and injuring the cap. I therefore leave the central opening 20 in the cap head to expose sufficient surface of the bolt head to be struck by a hammer. Even with this arrangement there is danger of striking the cap, and I therefore provide an extension or head 21 on the plug 11 which projects through and beyond the cap opening when the cap is in closing position, and this extension or head on the plug can be readily struck without danger of striking the cap and the bolt can be thus very readily driven into place without danger of marring or injuring the cap. At the same time the cap can be readily drawn outwardly to expose the oil hole. The spring abutment flange 17 on the bolt head is of such diameter that the cap body will engage with and slide thereover and be guided at its outer end thereon when it is pulled out to expose the oil hole, the inner end of the cap being guided by the engagement of the flange 16 with the bolt head. In the arrangement of Fig. 1 the spring is first slipped over the bolt shank and head against the flange 17, and the cap, whose inner end is primarily straight and unflanged, is then slipped over the head and spring, whereupon the inner end of the cap is turned inwardly to form the spring confining and abutment flange 16.

In Fig. 4 a modified arrangement is shown for adapting ready application of the spring and cap to a bolt on which the spring cannot be slipped into place over the shank. The bolt shown has the polygonal wrench receiving flange 22 which is considerably wider than the diameters of the shank and head. I therefore provide a detachable outer abutment for the spring in the form of a washer 23 held in place against the bolt head by the head 21 of the plug 11 when the plug is driven into the pocket 7. However, before the plug and washer are applied, the spring is slipped over the head and then the cap is slipped over the washer and its inner end turned down to form the retaining and abutment flange 16 for the spring. Fig. 4 shows the cap drawn outwardly to expose the oil hole 13, the washer 23 being of a diameter to form a guide for the outer end of the cap.

I thus produce a very simple yet very efficient oil bolt on which the oil hole protecting cap can be readily applied and shifted to expose the oil hole, and which when closed is in no danger of being struck and injured while the bolt is being driven into place.

I do not, of course, desire to be limited to the exact constructions and arrangements shown and described, as changes and modifications are no doubt possible which would still come within the scope of the invention.

I claim as follows:

1. An oil bolt having a longitudinal oil passageway and a transversely extending oil hole near one end thereof, a cap surrounding said end, an annular abutment at said end, a spring encircling the bolt and engaging at its outer end against said abutment, the inner end of said cap being flanged inwardly to form an inner abutment for said spring, said spring tending to hold said cap inwardly to cover said oil hole, and means for limiting the inward movement of said cap.

2. An oil bolt having a longitudinal oil passageway and a transversely extending oil hole near one end thereof, a cap surrounding said end, an annular abutment at said end, a spring encircling the bolt and engaging at its outer end against said abutment, the inner end of said cap being flanged inwardly to form an inner abutment for said spring, said spring tending to hold said cap inwardly to cover said oil hole, the head of said cap abutting against the end of said bolt to limit the inward movement of said cap, said cap being shiftable outwardly to expose said oil hole.

3. A bolt having a longitudinal oil passageway therethrough and a transversely extending oil hole at its end communicating with said passageway, a cap fitting over the bolt end, a spring surrounding said bolt end, an abutment at the outer edge of said end for the outer edge of said spring, the inner end of said cap forming an abutment for the inner end of said spring, said spring tending to hold said cap inwardly to cover the oil hole, the head of said cap abutting against the bolt end to limit the inward movement of said cap, said cap head having an opening for exposing a section of the bolt end whereby said bolt may be struck without striking the cap.

4. A bolt having a longitudinal oil passageway therethrough and a transversely extending oil hole at its end communicating with said passageway, a cap fitting over the bolt end, a spring surrounding said bolt end, an abutment at the outer edge of said end for the outer edge of said spring, the inner end of said cap forming an abutment for the inner end of said spring, said spring tending to hold said cap inwardly to cover the oil hole, the head of said cap abutting against the bolt end to limit the inward movement of said cap, said cap head having an opening, and a projection on the bolt end extending through said opening, said projection enabling striking and driving of the bolt without interfering with the cap.

5. An oil bolt having a longitudinal oil passageway therethrough and a transversely extending oil hole in its head, a peripheral abutment at the outer end of said head, a cap encircling said head and slidable over said abutment, the inner end of said cap being turned inwardly to form an abutment flange, a compression spring encircling said head between said abutments, said spring tending to hold said cap inwardly to cover said oil hole, the head of said cap abutting against the end of the bolt head to limit the inward movement of said cap, said head abutment forming a guide for said cap when drawn outwardly to expose said hole.

6. An oil bolt having a longitudinal oil passageway therethrough and a transversely extending oil hole in its head, a peripheral abutment at the outer end of said head, a cap encircling said head and slidable over said abutment, the inner end of said cap being turned inwardly to form an abutment flange, a compression spring encircling said head between said abutments, said spring tending to hold said cap inwardly to cover said oil hole, the head of said cap abutting against the end of the bolt head to limit the inward movement of said cap, said head abutment forming a guide for said cap when drawn outwardly to expose said hole, said cap head having an opening for exposing a section of the bolt head end whereby said bolt may be struck without striking said cap.

7. An oil bolt having a longitudinal oil passageway therethrough and a transversely extending oil hole in its head, a peripheral abutment at the outer end of said head, a cap encircling said head and slidable over said abutment, the inner end of said cap being turned inwardly to form an abutment flange, a compression spring encircling said head between said abutments, said spring tending to hold said cap inwardly to cover said oil hole, the head of said cap abutting against the end of the bolt head to limit the inward movement of said cap, said head abutment forming a guide for said cap when drawn outwardly to expose said hole, said cap head having an opening and said bolt head having a projection extending through said opening to be struck to drive the bolt without danger of striking the cap.

8. An oil bolt having a longitudinally extending pocket in its head and an oil distributing passageway through its shank communicating with the inner end of said pocket, an oil hole extending from the side of the head to the inner end of said pocket, a plug in the outer end of said pocket, a cap encircling said head and having its inner end deflected inwardly to form an inner abutment, a peripheral abutment at the outer edge of said head, a compression spring encircling said head between said abutments, said spring tending to hold said cap inwardly to cover said oil hole and being adapted to be drawn outwardly to expose said hole, the head of said cap abutting against the end of the bolt head to limit the inward movement of said cap, said plug having a head extending beyond the bolt head, and said cap head having an opening for receiving said plug head, said projecting plug head permitting driving of the bolt without danger of striking the cap.

9. An oil bolt having a longitudinal pocket in its head and an oil passageway leading from the inner end of said pocket into the bolt shank, an oil hole extending from one side of the head to the inner end of said pocket, a plug in the outer end of said pocket having a head, a washer held against the bolt head end by said plug head and projecting a distance beyond the sides of the bolt head to form an outer abutment, a cap encircling said bolt head and having an abutment at its inner end, a spring surrounding said bolt head between said abutments and tending to hold said cap inwardly to cover said oil hole, the cap head by engaging with the outer face of said washer limiting the inward movement of said cap, said cap head having an opening through which the plug head extends when the cap is in, said plug head enabling driving of the bolt without danger of striking the cap.

In witness whereof I hereunto subscribe my name this 26th day of February, A. D., 1917.

EDMUND NOLAN.

Copies of this patent may be obtained for five cents each, by addressing the "Commissioner of Patents, Washington, D. C."